United States Patent Office 3,355,426
Patented Nov. 28, 1967

3,355,426
THIAZOLE POLYMERS
James M. Craven, Wilmington, Del., assignor to E. I. du Pont de Nemours and Company, Wilmington, Del., a corporation of Delaware
No Drawing. Filed Aug. 26, 1963, Ser. No. 304,686
6 Claims. (Cl. 260—47)

This invention relates to thiazole polymers. It is more particularly directed to thiazole polymers having recurring units of the structure (1)

$$\left[ (X)_m - C \underset{S}{\overset{N}{\underset{||}{\bigvee}}} C - (Y)_n - C \underset{S}{\overset{N}{\underset{||}{\bigvee}}} C \right]$$

where

X can be —O—, and various aryl/diaryl ether groups (structures shown)

or various other aromatic and thiazole-containing groups

Y can be various aromatic and thiazole-containing groups $n$ can be 0 or 1; and
$m$ can be 0 or 1;

with the proviso that at least one of $m$ and $n$ must be 1; and with the further proviso that at least one of X and Y must be (one of the specified aromatic-ether or thiazole-containing groups shown).

UTILITY

The polymers of this invention are useful as film-forming ingredients in lacquers and other coating compositions. The insolubility of these polymers in common organic solvents makes coatings derived from such compositions especially durable.

When the molecular weight and flexibility of the polymer chains are sufficiently high, free self-supporting films can be cast from solutions of the polymers. These films, in turn, can by customary methods be fabricated into gaskets, insulators and other similar objects requiring a high degree of resistance to commonly encountered solvents.

In addition to the high degree of insolubility, those polymers of the invention which simultaneously contain only aromatic rings, thiazole rings and oxygen linkages have high thermal stability. This thermal stability, coupled with the high degree of insolubility, makes this class of polymers especially useful for the aforementioned purposes.

The polymers of the invention can be dissolved in such highly acidic solvents as dichloroacetic acid, trifluoroacetic acid, methanesulfonic acid and mixtures of para-toluenesulfonic acid and formic acid, to concentrations of as high as 10% to 30%, by weight. The polymers are insoluble in all neutral and basic solvents.

Coating compositions can therefore be made by simply dissolving from about 5–25%, by weight, of a suitable polymer in an appropriate solvent. This composition can be applied to the object to be coated by brushing, dipping or spraying. The resulting film should be dried at temperatures of from 50° C. to slightly below the boiling point of the solvent because the film, if dried at room temperature, may pick up sufficient moisture from the air to precipitate the polymer from solution.

Free self-supporting films can be made by casting a 5% to 25%, by weight, solution of the polymer on an even surface such as a glass or polytetrafluoroethylene plate. The solvent is then evaporated at an elevated temperature. The resulting film can then be stripped from the surface of the plate and cut into any desired form.

Preferred for these uses are polymers having recurring units of the structure (structure shown with aromatic-ether-thiazole-phenylene-thiazole repeat unit)

and polymers having recurring units of the structure (structure shown with aromatic-ether-thiazole-phenylene(S)-thiazole repeat unit)

PREPARATION OF THE POLYMERS

The polymers of the invention can be prepared according to the following general equation:

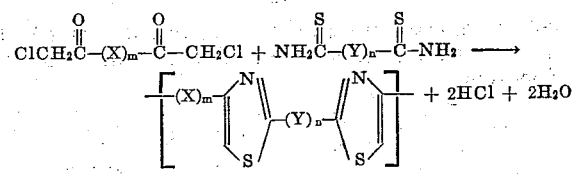

where X, Y, $m$ and $n$ are defined as in Formula 1.

According to this equation, equimolar proportions of a difunctional α-halo ketone and a difunctional thioamide are reacted in an inert solvent such as o-dichlorobenzene, dimethylacetamide, formic acid, or tetrahydrofuran. The reaction can be carried out at any temperature below the decomposition temperature of the thioamide reactant and above room temperature. The reaction time will vary from a few hours to about a week, depending of course upon the nature of the reactants.

If the product is insoluble in the reaction medium, completion of the reaction can be determined by periodic sampling and analysis, and the product can be recovered from the reaction mass by filtering it off and washing it with water. If the product is soluble in the reaction medium, the reaction is simply run until the desired viscosity is obtained, and the product can be recovered by pouring the reaction mass into water, with rapid stirring. This precipitates the polymer, which is then filtered from the mass, washed with water and dried.

The difunctional α-halo ketone reactants can be prepared according to procedures described in F. Kröhnke and I. Vogt, Chem. Ber., 86, 1132 (1953);
O. v. Schickh, Chem. Ber., 69, 242 (1936);
P. Ruggli and W. Theilheimer, Helv. Chim. Acta., 24, 899 (1941);
P. Ruggli, M. Herzog, J. Wegmann and H. Dahn, Helv. Chim. Acta., 29, 95 (1946);
Beilstein, Vol. 6, 1st Supplement, p. 417; and
P. Ruggli and K. Knecht, Helv. Chim. Acta., 27, 1108 (1944).

The thioamide reactants can be prepared from the corresponding nitriles according to procedures described in more detail in A. E. S. Fairfull, J. L. Lowe and D. A. Peak, J. Chem. Soc., 1952, 742, and R. N. Hurd and G. De La Mater, Chem. Rev., 61, 45 (1961).

The invention will be more easily understood and readily practiced by referring to the following illustrative examples:

Example 1

A mixture of 16.159 parts of 4,4'-bis(ω-chloroacetylphenyl) ether, 10.117 parts of 1,4-cyclohexanedithiocarboxamide and 200 parts of formic acid was stirred and heated at reflux temperature for 72 hours.

The resulting clear, yellow, viscous reaction mixture was poured into 1000 parts of distilled water with vigorous stirring. The white solid precipitate was filtered off, washed with distilled water and ether and then dried under vacuum to give a dry, white, solid polymer having recurring units of the structure

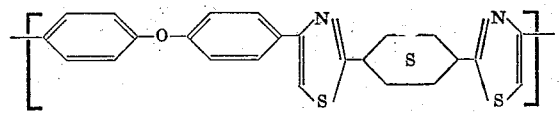

A lacquer can be prepared by dissolving 15 parts of this polymer in 100 parts of formic acid. This lacquer can be brushed on a metal plate and dried at 60° C. to give a clear, tough, durable, solvent resistant film.

The polymers in the following table can be similarly prepared from equimolar proportions of the corresponding listed reactants:

| Reactants | | Products |
|---|---|---|
| 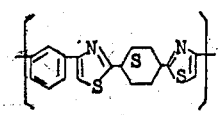 | | |

Example 2

To a mixture of 19.63 parts of dithioisophthalamide and 32.319 parts of 4,4'-bis(ω-chloroacetylphenyl) ether was added 1000 parts of o-dichlorobenzene.

This suspension was heated to 180° C. under nitrogen and with stirring. When the temperature reached 180° C., the mixture was refluxed for 168 hours, with stirring.

The reaction mixture was then filtered and the tan powder which was collected was washed with benzene, ether, methanol, water, methanol and finally ether, and then dried under vacuum.

The resulting polymer had recurring units of the structure.

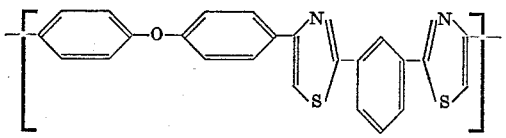

A solution was prepared by suspending one part of this polymer in seven parts of 98–100% formic acid and then adding seven parts of dichloroacetic acid. A film was cast by spreading the solution on a glass plate and heating at 60° C. for one hour, raising the temperature to 190° C. during one hour and finally heating at 190° C. for one hour.

The resulting film was stripped from the panel and found to be suitable for use in fabricating solvent- and heat-resistant gaskets.

Spreading the same solution on sheet copper and heating as above, gave the copper a heat- and solvent-resistant coating.

Example 3

A solution of 3.232 parts of 4,4'-bis(ω-chloroacetylphenyl) ether in 50 parts of dimethylacetamide was combined with a solution of 1.202 parts of dithiooxamide in 50 parts of dimethylacetamide.

The resulting clear orange solution was heated on a steam bath for 78 hours. The yellow precipitate which formed was then collected by filtration and washed with two 50 part-portions of dimethylformamide and then with five 100 part-portions of distilled water. The precipitate was then dried.

This polymeric product had recurring units of the structure

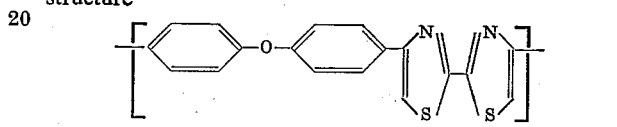

The polymers in the following table can be similarly prepared from equimolar proportions of the corresponding listed reactants:

| Reactants | | Products |
|---|---|---|
| 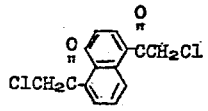 | 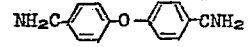 | 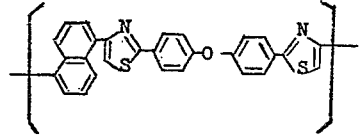 |
|  | 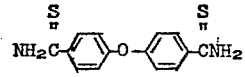 | 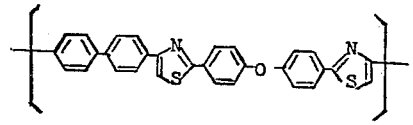 |
| 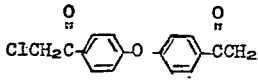 | 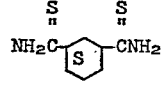 | 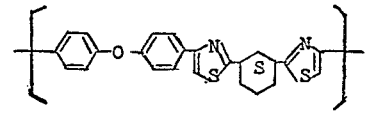 |
| 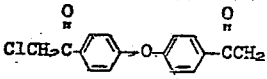 | 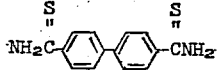 | 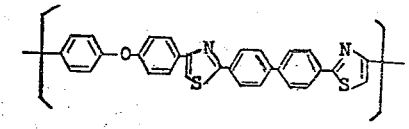 |
| 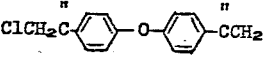 | 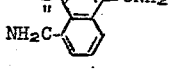 | 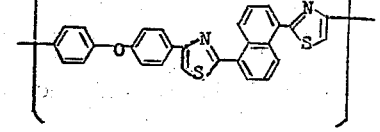 |
| 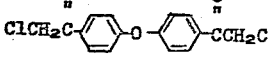 | 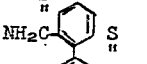 | 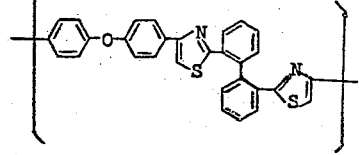 |

Example 4

A solution of 2.439 parts of 1,4-dibromo-2,3-butanedione in 50 parts of dimethylacetamide was combined with a solution of 2.023 parts of trans-1,4-cyclohexanedithiocarboxamide in 50 parts of dimethylacetamide. The mixture was then heated on a steam bath for 48 hours.

The resulting orange precipitate was filtered from the reaction mass, washed with four 100 part-portions of distilled water and dried under vacuum to give a light brown polymer having recurring units of the structure

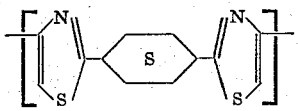

A 10% solution of this polymer in a mixture of equal proportions of trifluoroacetic acid and formic acid left a clear, brown, tough film when evaporated at 60° C.

Example 5

A solution of 1.012 parts of trans-1,4-cyclohexanedithiocarboxamide in 50 parts of dimethylacetamide was combined with a solution of 1.600 parts of 1,4-bis(bromoacetyl)benzene in 50 parts of dimethylacetamide.

The reaction mixture, a clear pale greenish yellow solution, was then heated on a steam bath for 192 hours.

The resulting yellow precipitate was filtered off and washed with dimethylacetamide, water and finally ether, and then dried. The polymeric product had recurring units of the structure

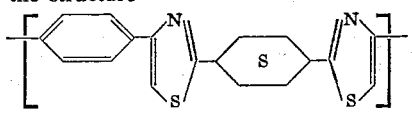

Example 6

To a mixture of 1.616 parts of 4,4'-bis(ω-chloroacetylphenyl) ether and 1.442 parts of 4,4'-oxybis(thiobenzamide) were added 50 parts of o-dichlorobenzene.

This mixture was stirred and heated at reflux for 72 hours. The resulting precipitate was filtered off, washed with benzene, methanol, water, methanol and finally ether, and then dried under vacuum. The polymer had recurring units of the structure.

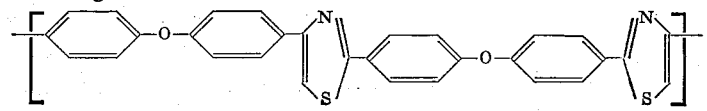

Example 7

A mixture of 3.2318 parts of 4,4'-bis(ω-chloroacetylphenyl) ether, 1.9630 parts of dithioterephthalamide and 50 parts of o-dichlorobenzene was heated at reflux temperature, with stirring, for 139 hours.

The resulting precipitate was filtered off and washed with methanol, water, methanol and finally ether, and then dried under vacuum.

This polymer had recurring units of the structure

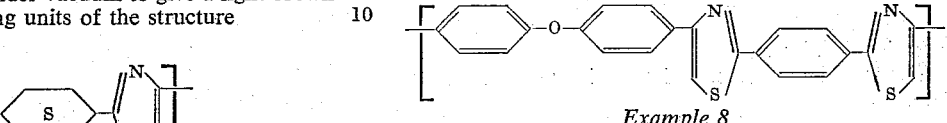

Example 8

A mixture of 1.96 parts of dithioisophthalamide, 2.63 parts of hydroquinone bis(chloroacetate) and 100 parts tetrahydrofuran was heated at reflux for 72 hours. The reaction mass was then poured into 1000 parts of water and the resulting precipitate isolated by filtration, washed with water and dried under vacuum. The polymer had recurring units of the structure

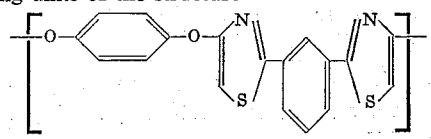

The polymers in the following table can be similarly prepared by reacting equimolar proportions of dithioisophthalamide with the corresponding listed reactants:

| Reactants | Products |
|---|---|
| ClCH₂C(O)-O-C(O)CH₂Cl | {-O-thiazole-phenyl-thiazole-} |
| ClCH₂C(O)-O-⌬-O-C(O)CH₂Cl | {-O-⌬-O-thiazole-phenyl-thiazole-} |
| ClCH₂C(O)-O-⌬-⌬-O-C(O)CH₂Cl | {-O-⌬-⌬-O-thiazole-phenyl-thiazole-} |
| ClCH₂C(O)-O-⌬(S)-O-C(O)CH₂Cl | {-O-⌬(S)-O-thiazole-phenyl-thiazole-} |

I claim:

1. A thiazole polymer consisting of recurring units of the structure

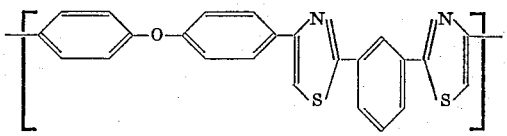

2. A thiazole polymer consisting of recurring units of the structure

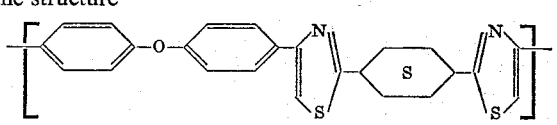

3. A coating composition comprising a thiazole polymer according to claim 1 and a solvent therefor.

4. A coating composition comprising a thiazole polymer according to claim 2 and a solvent therefor.

5. A film of a polymer according to claim 1.

6. A film of a polymer according to claim 2.

References Cited

Journal of Organic Chemistry, 26, 1961, Mulvaney et al., pp. 95–97, QD241 J6.

Journal of Polymer Science, Sheehan et al. Part A, vol. 3, 1965, pp. 1443–1462, QD 281 P6J62.

Helvetica Chimica Acta, vol. 27, 1944, Erlenmeyer et al., pp. 969–970.

Symposium on Fibrous Materials, Oct. 16–17, 1962, pp. 293–335, Sheehan et al., Dayton, Ohio.

WILLIAM H. SHORT, *Primary Examiner.*

H. SCHAIN, *Assistant Examiner.*